(12) United States Patent
Jolly (10) Patent No.: US 10,914,330 B1
(45) Date of Patent: Feb. 9, 2021

(54) FASTENER FOR INFLATABLE ARTICLES (71) Applicant: Jacqueline B. Jolly, Tucson, AZ (US)

(72) Inventor: Jacqueline B. Jolly, Tucson, AZ (US)

( * ) Notice: Subject to any disclaimer, the term of this patent is extended or adjusted under 35 U.S.C. 154(b) by 0 days.

(21) Appl. No.: 16/105,261

(22) Filed: Aug. 20, 2018

Related U.S. Application Data (60) Provisional application No. 62/547,649, filed on Aug. 18, 2017.

(51) Int. Cl.
*F16B 2/08* (2006.01)
*A63H 27/10* (2006.01)
*A44B 13/00* (2006.01)

(52) U.S. Cl.
CPC ............. *F16B 2/08* (2013.01); *A44B 13/007* (2013.01); *A63H 27/10* (2013.01); *A63H 2027/1008* (2013.01); *A63H 2027/1041* (2013.01)

(58) Field of Classification Search
CPC ............. F16B 2/08; A63H 2027/1008; A63H 2027/1041; A44B 13/007; F16G 11/101; Y10T 24/3984; Y10T 24/3987; Y10T 24/3991
See application file for complete search history.

(56) References Cited

U.S. PATENT DOCUMENTS

| 1,680,318 A | 8/1928 | Callahan | |
| 1,821,418 A * | 9/1931 | Brooks | G09F 3/0352 292/325 |
| 3,900,989 A | 8/1975 | Weisenthal | 46/88 |
| 4,008,912 A | 2/1977 | Kotov | 289/1.2 |
| 4,159,792 A * | 7/1979 | Siegal | A41D 19/0041 224/267 |
| 4,270,247 A * | 6/1981 | Freedom | A45D 8/34 24/115 A |
| 4,322,077 A * | 3/1982 | Van't Hof | A63B 49/08 473/551 |
| 4,391,063 A | 7/1983 | Gill, III | 46/90 |
| 4,802,877 A | 2/1989 | Davis et al. | 446/222 |
| 4,991,265 A * | 2/1991 | Campbell | B65D 63/1027 24/128 |
| 5,104,160 A | 4/1992 | Cheng | 289/17 |
| 5,314,217 A | 5/1994 | Place | 289/17 |
| 5,547,413 A | 8/1996 | Murray | 446/220 |
| 5,611,118 A * | 3/1997 | Bibbee | A42B 7/00 2/195.1 |
| 5,611,578 A | 3/1997 | Angelico, Sr. et al. | 289/17 |
| 5,628,091 A | 5/1997 | Mueller | 24/3.2 |

(Continued)

*Primary Examiner* — Robert Sandy
*Assistant Examiner* — Rowland Do
(74) *Attorney, Agent, or Firm* — Hayes Soloway P.C.

(57) ABSTRACT

An inflatable article fastener apparatus includes two lengths of flexible cord. First and second locking structures are connected to the two lengths of flexible cord, wherein the first and second locking structures are located at a spaced distance apart from one another on the two lengths of flexible cord. An eyelet portion is formed between the first and second locking structures and at least one non-eyelet portion is formed outside of the first and second locking structure. An end of the at least one non-eyelet portion is insertable through the eyelet portion to form a collapsible loop capable of constricting a neck of an inflatable article positioned within the collapsible loop. A locked position of the collapsible loop is achieved when the first locking structure is pulled through the eyelet portion.

16 Claims, 7 Drawing Sheets

(56) References Cited

U.S. PATENT DOCUMENTS

| | | | |
|---|---|---|---|
| 5,799,377 A | 9/1998 | Carroll et al. | 24/30.5 R |
| 5,896,623 A * | 4/1999 | Martin | F16L 3/233 |
| | | | 24/115 G |
| 6,161,314 A * | 12/2000 | Kamrin | A43B 3/30 |
| | | | 24/115 H |
| 6,716,083 B1 | 4/2004 | Castro | 446/220 |
| 7,249,991 B1 | 7/2007 | Watson | 446/220 |
| 9,802,742 B1 * | 10/2017 | Castro | B65D 63/1018 |
| 2003/0005557 A1 * | 1/2003 | Renn | B65D 63/16 |
| | | | 24/115 G |
| 2009/0049654 A1 * | 2/2009 | Iosue | F16G 11/101 |
| | | | 24/115 R |
| 2011/0208239 A1 | 8/2011 | Stone et al. | 606/228 |
| 2011/0253255 A1 | 10/2011 | Dellaquila | 141/98 |
| 2013/0232731 A1 * | 9/2013 | Schradin | B65D 63/1018 |
| | | | 24/16 R |

* cited by examiner

FASTENER FOR INFLATABLE ARTICLES

CROSS REFERENCE TO RELATED APPLICATION

This application claims benefit of U.S. Provisional Application Ser. No. 62/547,649 entitled, "Fastener for Inflatable Articles" filed Aug. 18, 2017, the entire disclosure of which is incorporated herein by reference.

FIELD OF THE DISCLOSURE

The present disclosure is generally related to fasteners and more particularly is related to fasteners for inflatable articles, such as balloons.

BACKGROUND OF THE DISCLOSURE

Inflatable articles, such as balloons, are used for a variety of purposes, including as decorative elements, marketing materials, party accessories, and even tools, such as medical tools. Commonly, balloons are inflated with air or other gas to the desired level and then sealed in the inflated state to prevent deflation. Sealing the balloon commonly includes tying the end (neck) of the balloon or using a fastener to clip the neck of the balloon closed such that the pressurized gas within the balloon cannot escape. While tying the balloon neck is the most popular means for sealing a balloon, it presents dexterity challenges for many users since it can be difficult to tie the balloon neck upon itself while the balloon is pressurized with air and tying the balloon neck tends to seal the balloon permanently. Conventional fasteners are commonly formed from rigid plastics or metals in a design which allows the fastener to clasp around the neck of the balloon and clip in place, e.g., such as an alligator clip design where the balloon neck is clasped between opposing jaws of the fastener. These fasteners can be permanent, they tend to leak air, and they can also cause damage to the balloon neck due to the interface of the latex (or other) rubber of the balloon contacting the metal or plastic material of the fastener.

Thus, a heretofore unaddressed need exists in the industry to address the aforementioned deficiencies and inadequacies.

SUMMARY OF THE DISCLOSURE

Embodiments of the present disclosure provide a system and method for an inflatable article fastener apparatus.

A first embodiment, in architecture, of the apparatus, can be implemented as follows. The inflatable article fastener apparatus has two lengths of flexible cord. First and second locking structures are connected to the two lengths of flexible cord. The first and second locking structures are located a spaced distance apart from one another on the two lengths of flexible cord. An eyelet portion is formed between the first and second locking structures and at least one non-eyelet portion is formed outside of the first and second locking structures. An end of the at least one non-eyelet portion is insertable through the eyelet portion to form a collapsible loop capable of constricting a neck of an inflatable article positioned within the collapsible loop. A locked position of the collapsible loop is achieved when the first locking structure is pulled through the eyelet portion.

One or more of the following features may be included. The first and second locking structures may further comprise knot structures formed by knotting the two lengths of flexible cord. The first and second locking structures may further comprise ball structures secured to the two lengths of flexible cord. The two lengths of flexible cord may be formed from an elastic, rubberized material. An unlocked position of the collapsible loop may be achieved when the end of the at least one non-eyelet portions at least partially inserted through the eyelet portion to form the collapsible loop prior to the first locking structure being pulled through the eyelet portion. A neck of an inflatable article may be insertable into an interior of the collapsible loop in the unlocked position, wherein the inflatable article may be capable of being inflated while the neck is positioned within the collapsible loop. The first locking structure may be sized larger than the second locking structure to prevent the first locking structure from being inadvertently moved through the openable gap of the eyelet portion. A first length of the two lengths of flexible cord may be shorter than a second length of the two lengths of flexible cord. At least one of the two lengths of flexible cord may terminate at the first locking structure. At least one of the two lengths of flexible cord may terminate at the second locking structure.

In another example of the first exemplary embodiment, the inflatable article apparatus has two lengths of flexible cord. First and second locking structures are connected to the two lengths of flexible cord. The first and second locking structures are located a spaced distance apart from one another on the two lengths of flexible cord. An eyelet portion is formed between the first and second locking structures and at least one non-eyelet portion is formed outside of the first and second locking structures. An end of at least one non-eyelet portion is insertable through the eyelet portion to form a collapsible loop. A neck with a passageway therein of an inflatable article is positionable within an interior of the collapsible loop. The collapsible loop is capable of constricting the neck of the inflatable article. The collapsible loop is positionable in a locked position when the first locking structure is pulled through the eyelet portion.

One or more of the following features may be included. The two lengths of flexible cord may be formed from the same material as the inflatable article. An unlocked position of the collapsible loop may be achieved when the end of the at least one non-eyelet portion is at least partially inserted through the eyelet portion to form the collapsible loop prior to the first locking structure being pulled through the eyelet portion. The first locking structure may have a size larger in width and height than the eyelet portion of the two lengths of flexible cord when the eyelet portion is in an unbiased state. The collapsible loop may be moved between the unlocked position and the locked position, which may result in the eyelet portion being biased to a size which allows passage of the first locking structure through the eyelet portion. The eyelet portion may be sized smaller than the first locking structure to prevent the first locking structure from being inadvertently moved through the openable gap of the eyelet portion when the collapsible loop is in the locked or unlocked positions. At least one of the two lengths of flexible cord may terminate at one of the first locking structure and the second locking structure.

A second embodiment, in architecture, of the apparatus can be implemented as follows. The article fastener apparatus has at least one length of flexible cord. First and second locking structures are connected to the at least one length of flexible cord. The first and second locking structures are located a spaced distance apart. A first portion is formed between the first and second locking structures and at least one second portion is formed outside of the first and second locking structures. At least one eyelet is formed within the first portion. An end of the length of flexible cord is insertable through the eyelet portion to form a collapsible loop. The collapsible loop is capable of constricting a neck of an article positioned within an interior of the collapsible loop. A locked position of the collapsible loop is achieved when the first locking structure is pulled through the eyelet portion.

One or more of the following may be included. The article may further comprise a balloon. The at least one eyelet may be biasable to enlarge an opening thereof, wherein in the locked position of the collapsible loop, the first locking structure may be retained by the eyelet on one side of the opening. Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
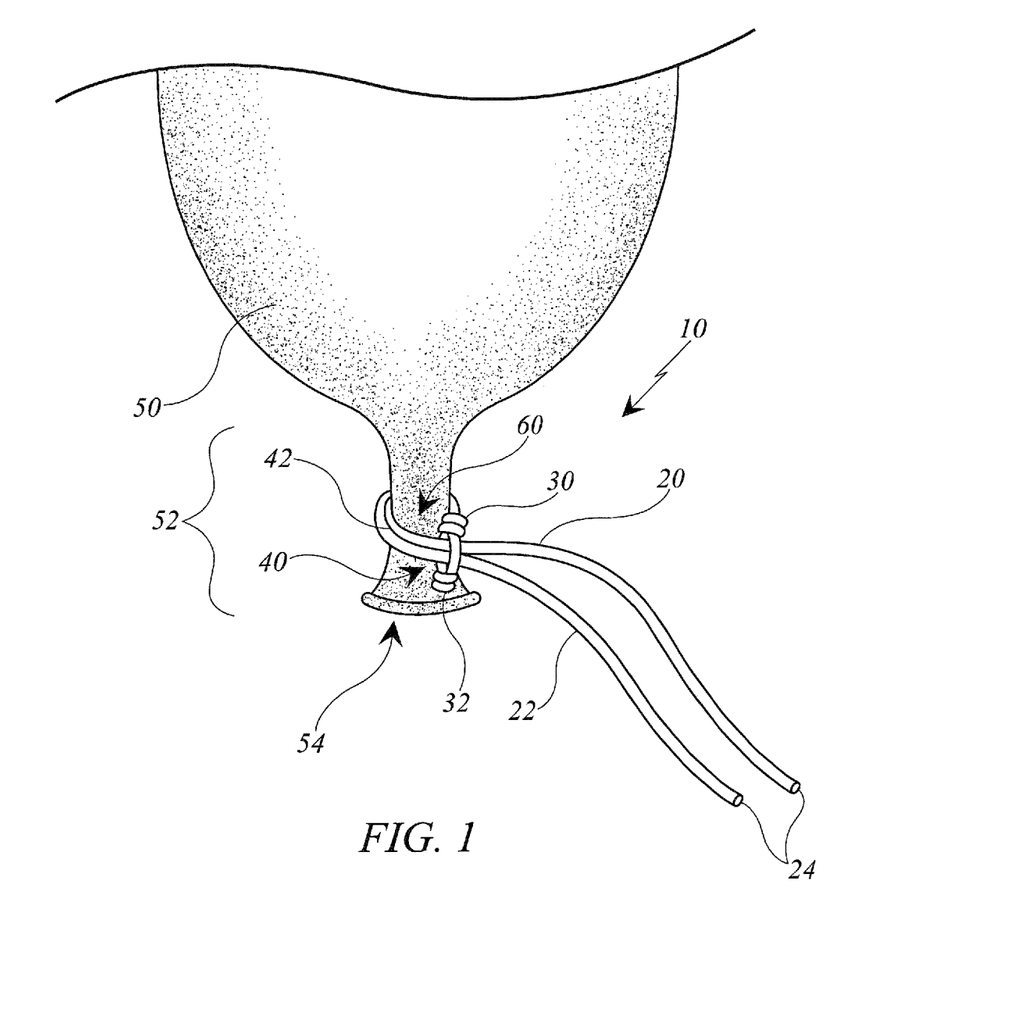
FIG. 1 is a front view illustration of an inflatable article fastener apparatus, in accordance with a first exemplary embodiment of the present disclosure.

FIG. 1 is a front view illustration of an inflatable article fastener apparatus 10, in accordance with a first exemplary embodiment of the present disclosure. The inflatable article fastener apparatus 10, which may be referred to herein simply as 'apparatus 10' may include two lengths of flexible cord 20, 22. First and second locking structures 30, 32, may be connected to the two lengths of flexible cord 20, 22, wherein the first and second locking structures 30, 32 may be located a spaced distance apart from one another on the two lengths of flexible cord 20, 22 together. An eyelet portion 40 may be formed between the first and second locking structures 30, 32 and at least one non-eyelet portion 42 may be formed outside of the first and second locking structures 30, 32. An end 24 of the at least one non-eyelet portion 42 may be insertable through the eyelet portion 40 to form a collapsible loop 60 capable of constricting a neck 52 of an inflatable article 50 positioned within the collapsible loop 60. A locked position of the collapsible loop 60 may be achieved when the first locking structure 30 is pulled through the eyelet portion 40.

Figure 2:
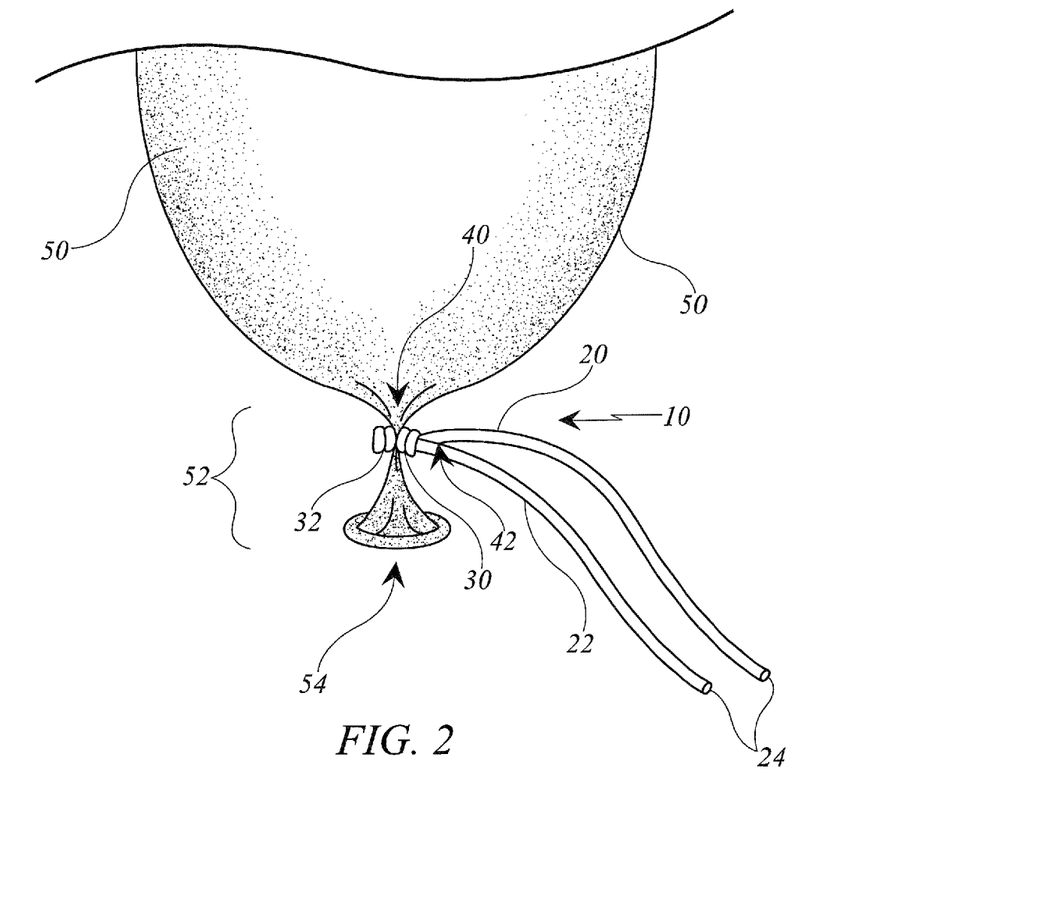
FIG. 2 is a front view illustration of the inflatable article fastener of FIG. 1 showing the passageway within the neck sealed closed, in accordance with the first exemplary embodiment of the present disclosure.

FIG. 2 is a front view illustration of the apparatus 10 of FIG. 1 showing the passageway 54 within the neck 52 sealed closed, in accordance with the first exemplary embodiment of the present disclosure. Here, the two lengths of flexible cord 20, 22 may be pulled through the eyelet portion 40 until the first locking structure 30 is drawn through the eyelet portion 40, at which point the eyelet portion 40 may contact the first locking structure 30. Due to the elasticity of the materials and the biased position of the two lengths of flexible cord 20, 22, the first locking structure 30 will be biased against the eyelet portion 40 but will be unable to be pulled through the eyelet portion 40, thereby achieving a static position which is capable of sealing the neck 52 of the inflatable article 50. Further details and images of this static position are provided relative to FIGS. 3D-3E.

It is noted that the apparatus 10 depicted in FIGS. 1-2 is shown with two lengths of flexible cord 20, 22 extending from the first locking structure 30 with no cord extending form the second locking structure 32. Depending on the design and implementation of the invention, the apparatus 10 may include the lengths of cord 20, 22 extending on only one side of the first locking structure 30, or positioned extending from both the first locking structure 30 and the second locking structure 32, such as shown in FIG. 4C. The use of cord 20, 22, positioned on one or both of the locking structures 30, 32 may vary depending on the design of the apparatus 10 and its intended use. For example, it may be preferable for the lengths of cord 20, 22 to extend only from the first locking structure 30, such that a right-handed user can easily grasp the two lengths of cord 20, 22 during use of the apparatus 10. In another example, particularly for left-handed users, it may be desired to have the two lengths of cord 20, 22 positioned extending from the second locking structure 32. Still further, it may be possible to have two lengths of cord 20, 22 positioned from both the first and second locking structures 30, 32 such that the apparatus 10 is universally usable to any preference of the user. All variations and designs are considered within the scope of the present disclosure.

The apparatus 10 may be used to seal inflatable devices, commonly balloons, but also any other inflatable devices which have a design with a neck or similar feature which is conventionally closed by knotting or clasping it. Commonly, the inflatable article 50 may include a latex balloon or balloon formed from a similar rubberized material. The inflatable article 50 may include a narrowed neck 52 which is used to introduce air or other gas, such as helium, into the interior space of the inflatable article 50 until it reaches the desired size or pressure. While the inflatable article 50 may be recognized commonly as a balloon used for decoration, advertising, marketing or similar functionality, the inflatable article 50 may also include other uses of a balloon, such as a medical tool or other tool which includes an inflatable rubberized portion. It is also noted that the apparatus 10 can be used with articles 50 that are filled or inflated with liquids, such as water balloons. However, the apparatus 10 may have other applications outside of use with inflatable device. For instance, the apparatus 10 may be used with objects that are not inflatable, such as to seal food products, as a hair fastener, etc. The shape and design of the apparatus 10 allows it to be used to successfully seal the passageway 54 within the neck 52 of the inflatable article 50 easily, repeatedly, and without limitations of a user's dexterity. The two lengths of flexible cord 20, 22 may be constructed from rubberized material, such as latex, silicon, or similar material, which is resilient, flexible, and at least partially elastic. The material may be durable enough to withstand tying and stretching without breaking. In one example, the two lengths of flexible cords 20, 22 may be formed from the same material as the inflatable article 50 itself, which may increase the friction between the exterior of the neck 52 of the inflatable article 50 and the two lengths of flexible cord 20, 22.

The size of the two lengths of flexible cord 20, 22 may vary. For instance, a first length of the two lengths of flexible cord 20, 22 may be shorter than a second length of the two lengths of flexible cord 20, 22. In one example, the two lengths of flexible cord 20, 22 may be approximately 1/16-1/8 inches in diameter and approximately 3-6 inches long. It is noted that while the length of the flexible cord 20, 22 may be any length, it may be desirable to keep the length relatively small, so as to not add significant additional weight to the inflatable article 50 when inflated. If the two lengths of flexible cords 20, 22 are too long, the inflatable article 50, filled with helium or other light-weight gasses, may be too heavy to achieve flotation.

Figure 3A:
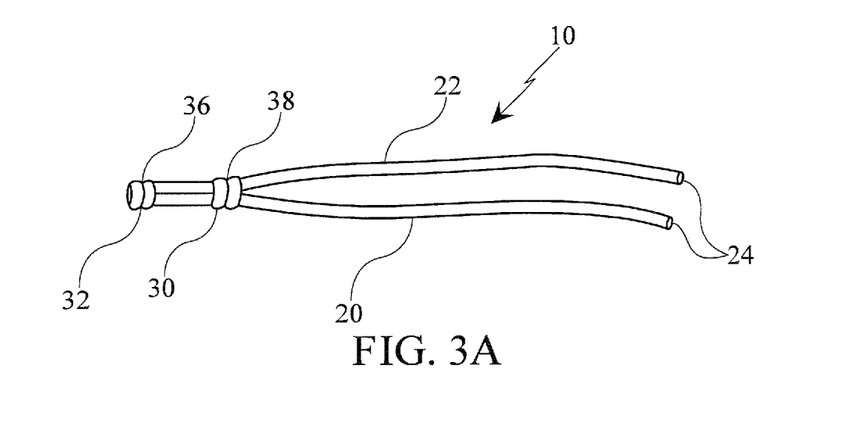
FIGS. 3A-3C are front view illustrations of the apparatus of FIGS. 1-2 without the inflatable article, in accordance with the first exemplary embodiment of the present disclosure.
Figure 3B:
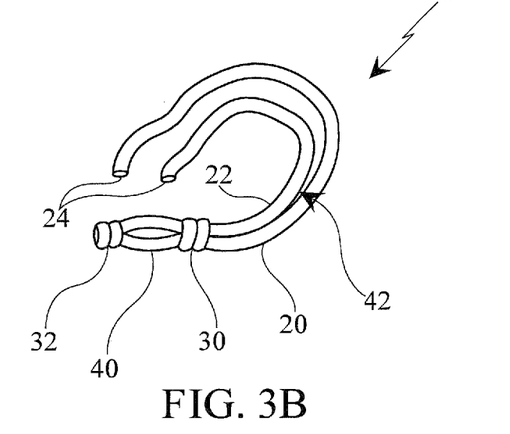
Figure 3C:
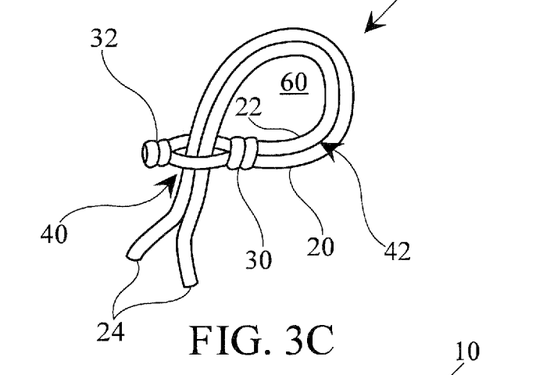

The size of the eyelet portion 40 and the first and second locking structures 30, 32 may also vary. For example, the first locking structure 30 may have a size larger in width and height than the eyelet portion 40 of the two lengths of flexible cord 20, 22 when the eyelet portion 40 is in an unbiased state. As another example, the eyelet portion 40 may be approximately ½ inch in length with each of the first and second locking structures 30, 32 may be approximately ⅛-¼ wide., Other sizes, shapes, and dimensions of the two lengths of flexible cord 20, 22 may be used without departing from the scope of the present disclosure. FIGS. 3A-3C are front view illustrations of the apparatus 10 of FIGS. 1-2 without the inflatable article, in accordance with the first exemplary embodiment of the present disclosure. In particular, FIGS. 3A-3C illustrate the construction of the two lengths of flexible cord 20, 22 and the first and second locking structures 30, 32. In FIG. 3A, the two lengths of flexible cord 20, 22 are positioned side by side one another and the first and second locking structures 30, 32. The first and second locking structures 30, 32 may be comprised of first and second knot structures 36, 38 or first and second ball structures 36, 38. The first and second knot structures 36, 38 may be formed by tying the two lengths of flexible cord 20, 22 over each other using two overhand knots. The first and second knots 36, 38 may bind the two lengths of flexible cord 20, 22 together, such that the two lengths of flexible cord 20, 22 are inseparable from one another at the knot structures 36, 38, but otherwise may be at least partially separable from one another. The first and second ball structures 36, 38 may be secured to the two lengths of flexible cord 20, 22, wherein the ball structures may be substantially integral with the two lengths of flexible cord 20, 22 by creating inseparable, fused points between the two lengths of flexible cord 20, 22. The second ball structure 36 may be provided to aid in removal of the apparatus 10. The first and second ball structures 36, 38 may be constructed from the same material as the two lengths of flexible cord 20, 22 with known techniques, such as molding, mechanical bonding, or chemical bonding (i.e. thermal bonding).

As shown in FIG. 3B, when the two locking structures 30, 32 are biased towards one another, the eyelet portion 40 may be positioned between the first and second locking structures 30, 32. The eyelet portion 40 may largely remain in a closed or narrowed position when the two lengths of flexible cord 20, 22 are untouched, as the natural flexing and biased shape of the cords 20, 22 allows the two lengths of cord 20, 22 forming the eyelet portion 40 to contact one another. When desired, the user may push the two locking structures 30, 32 closer together until the eyelet portion 40 is formed, at which point the ends 24 of the two lengths of flexible cord 20, 22 may be positioned within the eyelet portion 40 and drawn therethrough until the position shown in FIG. 3C is achieved. At this position, it can be seen that a collapsible loop 60 may be formed by the two cords 20, 22, whereby pulling the ends 24 of the two lengths of flexible cord 20, 22 further through the eyelet portion 40 causes the collapsible hole 60 to shrink.

A user may then place the neck 52 of the inflatable article 50 within the collapsible loop 60 formed by the two cords 20, 22 and tighten the collapsible loop 60 around the neck 52. When the collapsible loop 60 is loosely contacting the neck 52, the passageway 54 within the neck 52 may still allow the passage of air or gas. This configuration is illustrated in FIG. 1. As the collapsible loop 60 is made smaller, by drawing the two lengths of flexible cord 20, 22 further through the eyelet portion 40, the two lengths of flexible cord 20, 22 may tighten around the exterior of the neck 52 causing it to close in on itself and eventually seal off the passageway 54 therein. Then the apparatus 10 may be placed in a locked position.

Figure 3D:
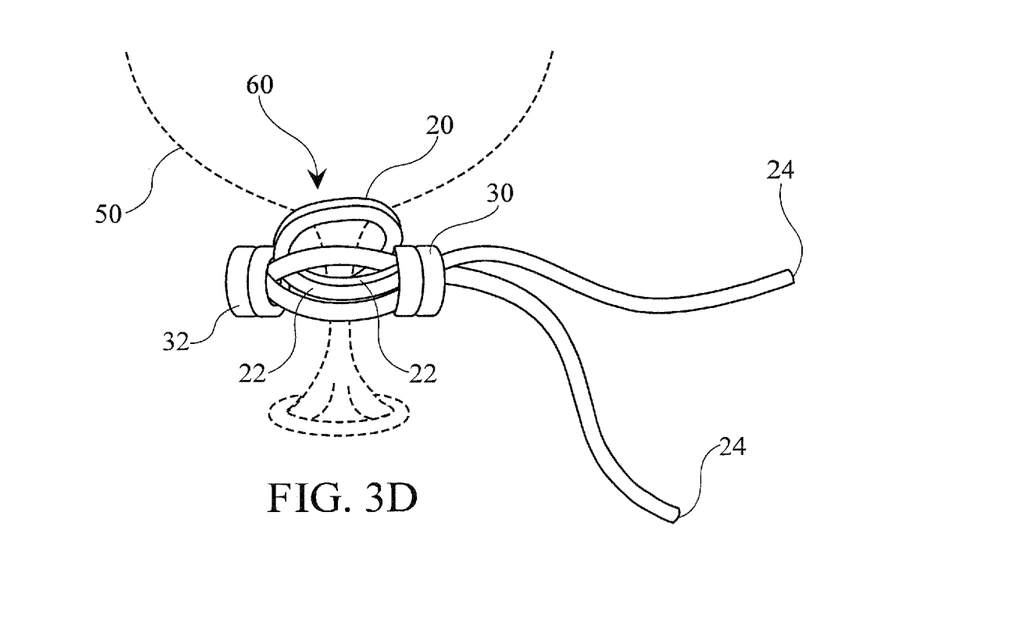
FIG. 3D is a front view illustration of the apparatus of FIGS. 1-3C near a closed position but without the inflatable article, in accordance with the first exemplary embodiment of the present disclosure.
Figure 3E:
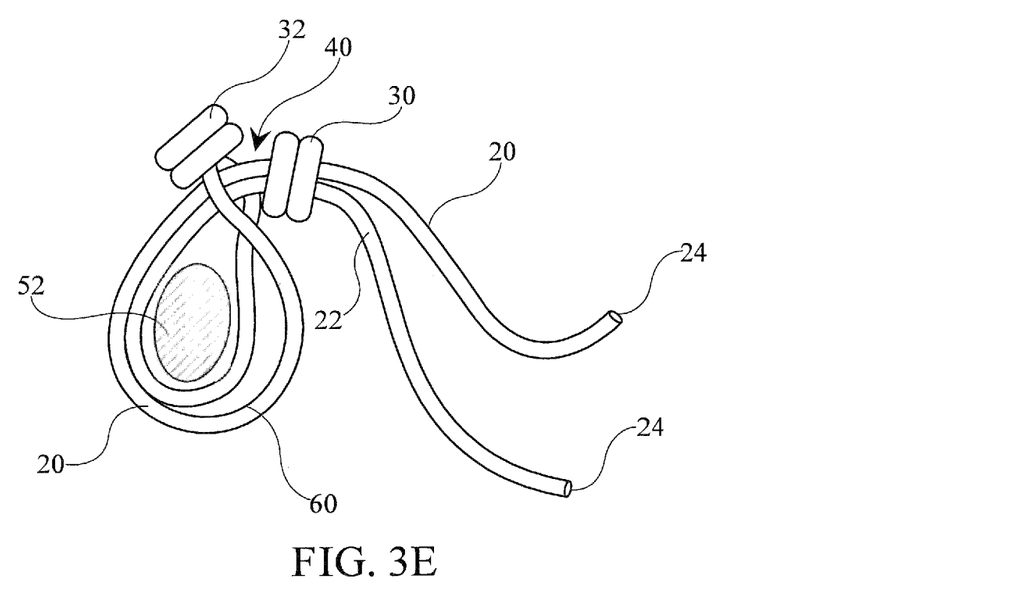
FIG. 3E is a top view illustration of the apparatus of FIGS. 1-3D near a closed position showing a cross section of a neck of an inflatable article, in accordance with the first exemplary embodiment of the present disclosure.

Achieving a locked position with the apparatus 10 is described relative to FIGS. 3D-3E. FIG. 3D is a front view illustration of the apparatus 10 of FIGS. 1-3C near a closed position, but without the inflatable article, in accordance with the first exemplary embodiment of the present disclosure. FIG. 3E is a top view illustration of the apparatus 10 of FIGS. 1-3D near a closed position showing a cross section of a neck 52 of an inflatable article 50, in accordance with the first exemplary embodiment of the present disclosure. It is noted that apparatus 10 is illustrated near a closed position where the locking structure 30 has been pulled through the eyelet 40.

However, in a fully closed position, the locking elements 30, 32 would be tightly biased together such that they are touching. For clarity in disclosure, the apparatus 10 in FIGS. 3D-3E is shown with the locking elements 30, 32 slightly spaced apart slightly so the details of the apparatus 10 in the closed position can be fully understood.

From the position of FIG. 3C, the ends 24 of the two lengths of flexible cord 20, 22 may be pulled through the eyelet portion 40 until the first locking structure 30 is pulled through the eyelet portion 40, as shown in FIG. 3D, wherein in use of the apparatus 10, an object would be present to allow the eyelet portion 40 of the two lengths of flexible cord 20, 22 to form the collapsible loop 60. In this position, when an object is present in the collapsible loop 60, as shown in FIG. 3E, the eyelet portion 40 may be positioned around the neck 52 of the inflatable article within the collapsible loop 60 and it contacts the first locking structure 30. The elasticity of the materials and the biased position of the two lengths of flexible cord 20, 22 may retain the first locking structure 30 in a static, biased position against the eyelet portion 40. The size of the first locking structure 30 relative to the eyelet portion may prevent the first locking structure 30 from being inadvertently biased through the eyelet portion 40, such that the inflatable article 50 can remain inflated. Accordingly, it is possible to keep the inflatable article 50 sealed closed for extended periods of time with the apparatus 10, as described.

Additionally, FIG. 1 and FIG. 3 show the apparatus 10 in an unlocked position. The unlocked position is achieved either before or when the end 24 of the at least one non-eyelet portion 42 is at least partially inserted through the eyelet portion 40 to form the collapsible loop 60 but before the first locking structure 30 is pulled through the eyelet portion 40 to a degree where the collapsible loop 60 is tightly constricted. Further, when the apparatus 10 is in an unlocked position, the neck 52 of the inflatable article 50 is capable of being inserted into the collapsible loop 60 and, once inserted, is capable of being inflated.

To move the apparatus to the locked position, the end 24 of the at least one non-eyelet portion 42 is pulled through the eyelet portion 40 until the first locking structure 30 is pulled through the closing edge of the eyelet portion 40. Once pulled through, the first locking structure 30 is retained by the cords of the eyelet portion 40 with the eyelet portion 40 positioned around the neck of the article in a constricted state.

When the collapsible loop 60 is moved between the unlocked position and the locked position, the eyelet portion 40 may be biased to a size which allows passage of the first locking structures 30, 32 through the eyelet portion 40. When the collapsible loop 60 is in the locked and unlocked positions, the eyelet portion 40 may be sized smaller than the first locking structure 30 to prevent the first locking structure 30 from being inadvertently moved through the eyelet portion 40.

To remove the apparatus 10 from the locked position, the first locking structure 30 may be purposefully moved through the eyelet portion by a user simply by pushing the first locking structure through the eyelet portion 40 and pulling the end 24 of the at least one non-eyelet portion through the eyelet portion 40.

One particular benefit of the subject disclosure is that the design disclosed herein is capable of being reused, unlike the conventional tying of balloon necks or using plastic or metal clasp fasteners. It is very difficult to untie a knotted balloon neck and trying to do so would likely puncture the balloon material itself, thereby causing a leak. Plastic or metal clasp fasteners are not always removable, but when they are, it has been found that the contact between the sealing contours of the plastic or metal material and the rubber of the balloon can damage the balloon's rubber, often causing indentations, weak spots, or punctures. The subject disclosure improves over these devices and methods by allowing for removal of the two lengths of flexible cord 20, 22 from the neck 52, as discussed above.

Further, since the first and second locking structures 30, 32 may be comprised of the same material, rubber or a similar material, as the two lengths of flexible cord 20, 22 no pinching, puncturing, or other damage will occur to the neck 52 of the inflatable article 50.

Accordingly, the subject disclosure may allow for repeated use of inflatable articles 50 which may prevent waste and save money. For example, balloons used for marketing at tradeshow tables may be used for a few hours, then easily deflated and stored until the next use. Similarly, the apparatus 10 allows for the user to selectively adjust the inflation of a balloon, such as to decrease the air, add more air, etc. Another benefit of the subject disclosure is that the dexterity required by the user to use the apparatus 10 is far less than untying a conventional knotted balloon neck, thereby allowing users such as children, the elderly, people with arthritis, etc. to inflate balloons as they wish. It is also noted that the two lengths of flexible cord 20, 22 of the apparatus 10 may be faster to use to seal a balloon than any conventional methods, especially when the two lengths of flexible cord 20, 22 are sold with the locking structures.

Figure 4A:
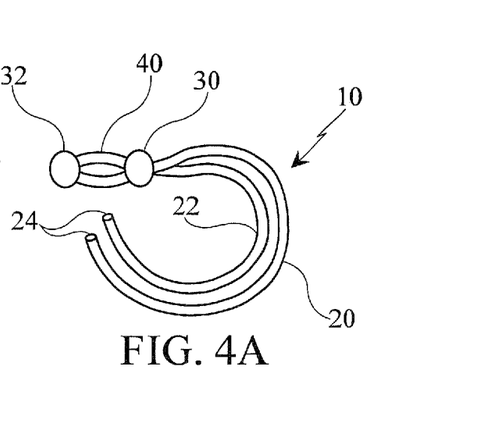
FIGS. 4A-4F are front view illustrations of an inflatable article fastener apparatus, in accordance with a first exemplary embodiment of the present disclosure.
Figure 4B:
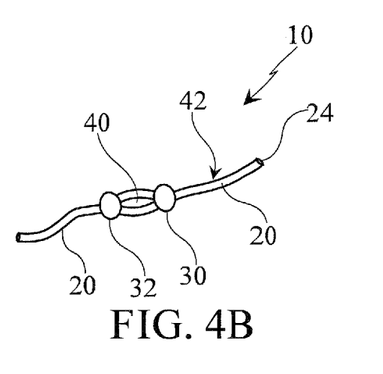
Figure 4C:
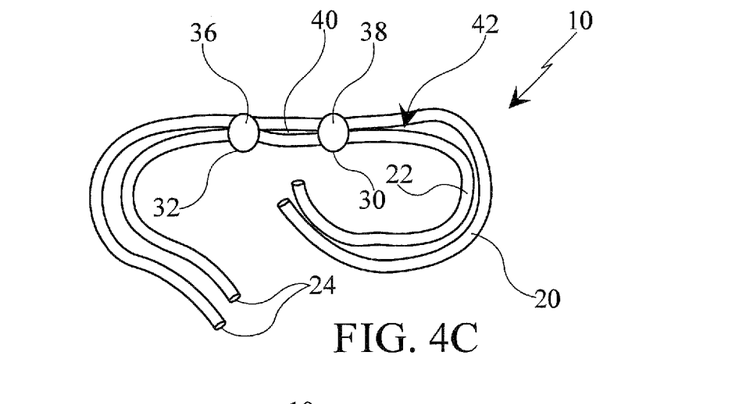

FIGS. 4A-4F are front view illustrations of an inflatable article fastener apparatus 10, in accordance with the first exemplary embodiment of the present disclosure. As shown in FIG. 4A, the inflatable article fastener apparatus 10 may include two lengths of flexible cord 20, 22, wherein at least one of the two lengths of flexible cord 20, 22 may terminate at the second locking structure 32. Alternatively, the at least one of the two lengths of flexible cord 20, 22 may terminate at the first locking structure 30.

Figure 4D:
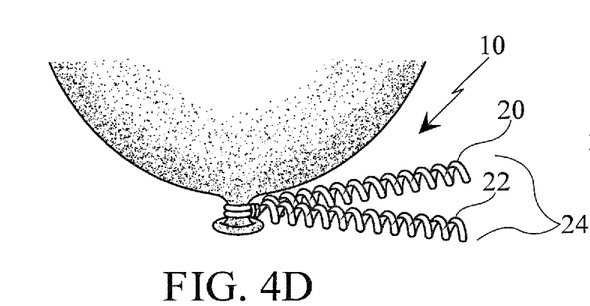

FIG. 4B depicts a design where the at least one non-eyelet portion 42 may be comprised of the two lengths of flexible cord 20, 22 fused together. FIG. 4C is a similar design to what is shown in FIG. 4B with the exception that there are non-eyelet portions 42 on either side of the first and second locking structures 30, 32. FIG. 4D is an illustration showing the two cords 20, 22, or end sections thereof, having a coiled or ribbon design to increase the aesthetic appeal of the apparatus 10.

Figure 4E:
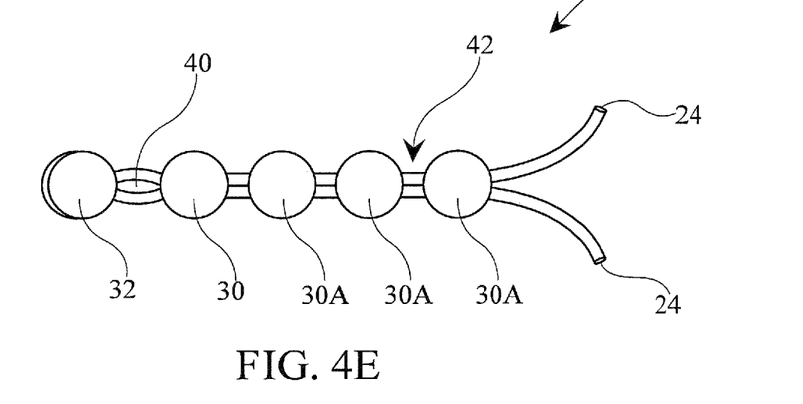
Figure 4F:
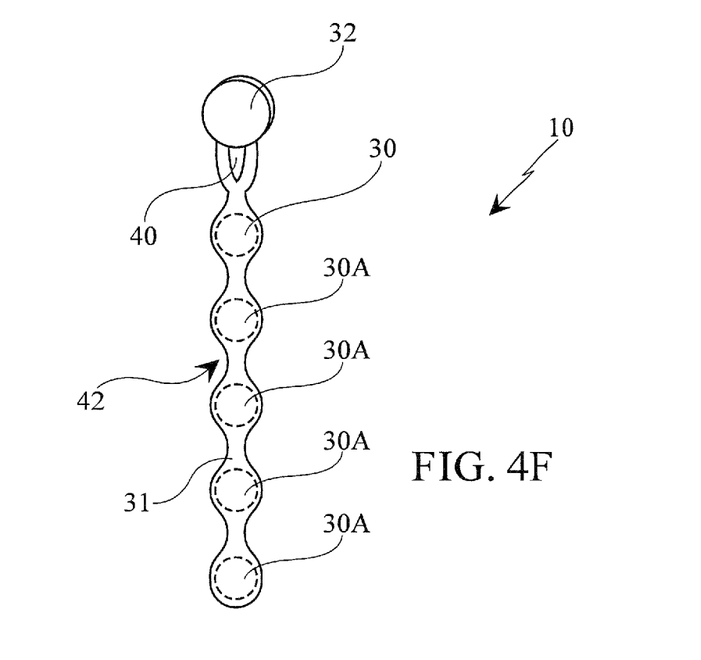

FIG. 4E is an illustration showing the apparatus 10 with a first locking structure 30 connected to the second locking structure 32 through the eyelet portion 40, and where the non-eyelet portion 42 includes one or more additional locking structures 30A. The additional locking structures 30A may be positioned spaced on the non-eyelet portion 42 such that the user can select which of the additional locking structures 30A to be moved through the eyelet portion 40 if the article to be constricted by the apparatus 10 has a size which exceeds use of the first locking structure 30. For example, if the user desires to use the apparatus 10 as a ponytail hair tie or similar fastener, he or she may select one of the additional locking structures 30A to move through the eyelet portion 40 since the diameter of the ponytail is likely too large for use of the first locking structure. FIG. 4F is an illustration of a similar design which shows the apparatus with a first locking structure 30 connected to the second locking structure 32 through the eyelet portion 40, and where the non-eyelet portion 42 includes one or more additional locking structures 30A which are substantially encapsulated by an encapsulation material 31. Here, the additional locking structures 30A may be positioned within the encapsulation material 31 such that the non-eyelet portion 42 is formed as substantially one unitary structure. However, the general shape of the additional locking structures 30A relative to the cord between the additional locking structures 30A remains enlarged such that the additional locking structures 30A are readily usable to be constrained within the eyelet portion 40. The encapsulation material 31 may include any type of rubberized, plastic, or similar-type material which can be formed around the additional locking structures 30A. Preferably, the encapsulation material is a durable, flexible material, such as latex.

Figures 5A, 5B, 5C:
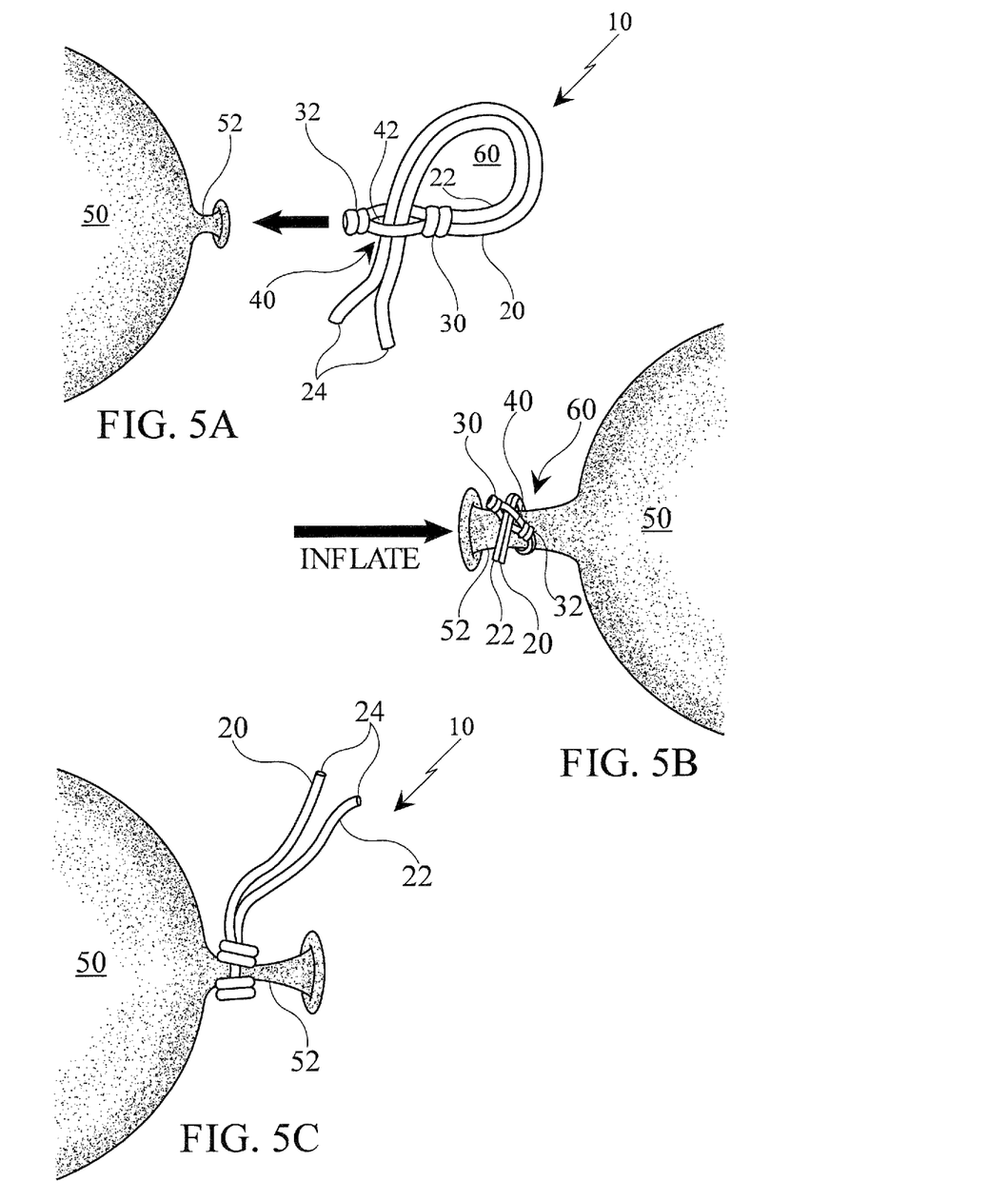
FIGS. 5A-5C are front view illustrations of a method of using the apparatus of FIGS. 1-3C, in accordance with a first exemplary embodiment of the present disclosure.

FIGS. 5A-5C are front view illustrations of a method of using the apparatus 10 of FIGS. 1-3D, in accordance with the first exemplary embodiment of the present disclosure. As is shown in FIG. 5A, the two flexible lengths of cord 20, 22 may be positioned to form the collapsible hole 60 through which the neck 52 of the inflatable article 50 may be positioned.

FIG. 5B illustrates the neck 52 of the inflatable article 50 positioned through the collapsible hole 60. When the position of FIG. 5B is achieved and the neck 52 is positioned through the collapsible hole 60, the user may then inflate the inflatable article 50. When the inflatable article 50 achieves the desired size or pressure, the user may then simply pull the ends of the two lengths of flexible cord 20, 22 to collapse the collapsible loop 60, thereby constricting the neck 52 until it seals in the locked position, as previously described. The ability to inflate the inflatable article 50 after the two lengths of flexible cord 20, 22 are positioned around the neck 52 may increase the efficiency of inflating balloons or similar devices, since the user would not need to manually keep the neck 52 sealed, e.g., with the user's fingers, while positioning the two lengths of flexible cord 20, 22 around the neck 52.

Figure 6:
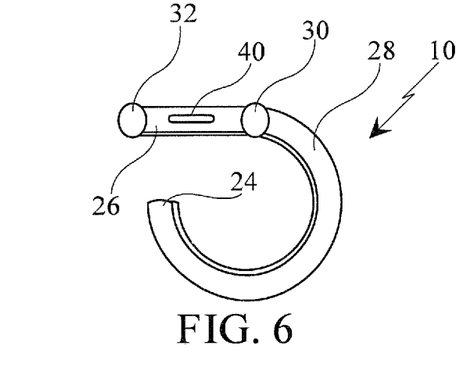
FIGS. 6 is a front view illustration of an article fastener apparatus, in accordance with a second exemplary embodiment of the present disclosure.

FIG. 6 is a front view illustration of the apparatus 10, in accordance with a second exemplary embodiment of the present disclosure. The inflatable article fastener apparatus 10 may have at least one length of flexible cord 28. First and second locking structures 30, 32 may be connected to at least one length of flexible cord, wherein the first and second locking structures 30, 32 may be located a spaced distance apart. A first portion 26 may be formed between the first and second locking structures 30, 32. At least one flexible cord 28 may be formed outside of the first and second locking structures. At least one eyelet portion 40 may be formed within the first portion 26, wherein an end 24 of the at least one length of flexible cord 28 may be insertable through the at least one eyelet portion 40 to form a collapsible loop 60. The eyelet portion 40 may be formed prior to or during use with the inflatable article fastener apparatus 10 by various means, such as cutting a slit within the first portion 26. The collapsible loop 60 may be capable of constricting a neck of an inflatable article 10 positioned within the collapsible loop 60. A locked position of the collapsible loop 60 may be achieved when the first locking structure 30 is pulled through the at least one eyelet portion 40. In this embodiment, the inflatable article 50 may be comprised of a balloon. The at least one eyelet portion 40 may be biasable to enlarge an opening thereof, wherein when the inflatable article apparatus 10 is in the locked position within the collapsible loop 60, the first locking structure 30 may be retained by the at least one eyelet 40 on one side of the opening of the at least one eyelet portion 40.

Additionally, two lengths of flexible cord may be fused together along their length to form the at least one length of flexible cord 28, as shown in FIG. 6. The at least one length of flexible cord 28 may have a flat or a curved profile. The at least one length of flexible cord 28 may include the first and second locking structures 30, 32. The first and second locking structures 30, 32 may be comprised of knot structures 36, 38 or ball structures 36, 38. The first and second locking structures may be sized to be pulled through the eyelet portion 40 by a user but do not inadvertently become removed from the at least one eyelet portion 40. For example, the first locking structure 30 may be pulled through the at least eyelet portion 40 to a point where it contacts one exterior side of the at least one eyelet portion 40 thereof and is then frictionally retained abutting the one exterior side of the at least one eyelet portion 40 to maintain a static position. Additionally, all of the features of the first exemplary embodiment are included herein.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. An article fastener apparatus comprising:
two lengths of flexible cord, the two lengths of flexible cord being elastic;
first and second locking structures non-movably connected to the two lengths of flexible cord, wherein the first and second locking structures are formed from the same material as the two lengths of flexible cord, wherein the first and second locking structures are located a spaced distance apart from one another on the two lengths of flexible cord, wherein an eyelet portion is formed by the two lengths of flexible cord between the first and second locking structures and at least one non-eyelet portion is formed by the two lengths of flexible cord located outside of the first and second locking structures, the at least one non-eyelet portion terminating at free ends of the two lengths of cord; and
a collapsible loop formed by the free ends of the two lengths of flexible cord of the at least one non-eyelet portion being inserted through the eyelet portion, wherein the collapsible loop has a closed position where the first locking structure is pulled entirely through the eyelet portion and is elastically biased in contact against the second locking structure, wherein the first locking structure is being frictionally retained in a static position against the second locking structure, and wherein the collapsible loop is capable of constricting an article positioned within the collapsible loop.

2. The article fastener apparatus of claim 1, wherein the first and second locking structures further comprise knots within the two lengths of flexible cord.

3. The article fastener apparatus of claim 1, wherein the first and second locking structures further comprise ball structures secured to the two lengths of flexible cord.

4. The article fastener apparatus of claim 1, wherein the two lengths of flexible cord are formed from a rubberized material.

5. The article fastener apparatus of claim 1, wherein an unlocked position of the collapsible loop is achieved when the free ends of the at least one non-eyelet portion are at least partially inserted through the eyelet portion to form the collapsible loop prior to the first locking structure being pulled through the eyelet portion.

6. The article fastener apparatus of claim 5, wherein the article is inserted into an interior of the collapsible loop in the unlocked position, wherein the article is inflated while the article is positioned at least partially within the collapsible loop, and wherein after inflation of the article, the collapsible loop is moved to the closed position.

7. The article fastener apparatus of claim 1, wherein a first length of the two lengths of flexible cord is shorter than a second length of the two lengths of flexible cord.

8. The article fastener apparatus of claim 1, wherein at least one of the two lengths of flexible cord terminates at the first locking structure.

9. The article fastener apparatus of claim 1, wherein at least one of the two lengths of flexible cord terminates at the second locking structure.

10. The inflatable balloon fastener apparatus of claim 1, wherein at least one of the two lengths of flexible cord terminates at one of the first locking structure and the second locking structure.

11. An inflatable balloon fastener apparatus comprising:
two lengths of flexible cord, the two lengths of flexible cord being elastic;
first and second locking structures non-movably connected to the two lengths of flexible cord, wherein the first and second locking structures are formed from the same material as the two lengths of flexible cord, wherein the first and second locking structures are located a spaced distance apart from one another on the two lengths of flexible cord, wherein an eyelet portion is formed by the two lengths of flexible cord between the first and second locking structures and at least one non-eyelet portion is formed by the two lengths of flexible cord located outside of the first and second locking structures, the at least one non-eyelet portion terminating at free ends of the two lengths of cord;
a collapsible loop formed by the free ends of the two lengths of flexible cord of the at least one non-eyelet portion being inserted through the eyelet portion, wherein the collapsible loop has a closed position where the first locking structure is pulled entirely through the eyelet portion and is elastically biased in contact against the second locking structure, wherein the first locking structure is being frictionally retained in a static position against the second locking structure; and
an inflatable balloon having a neck with a gas passageway therein, wherein the neck is positioned within an interior of the collapsible loop, wherein when the collapsible loop is in the closed position, the neck of the inflatable balloon is constricted by the collapsible loop thereby retaining a quantity of pressurized air within the inflatable balloon.

12. The inflatable balloon fastener apparatus of claim 11, wherein the two lengths of flexible cord are formed from a rubberized latex material, and wherein the inflatable balloon is formed from a rubberized latex material.

13. The inflatable balloon fastener apparatus of claim 11, wherein an unlocked position of the collapsible loop is achieved when the free ends of the at least one non-eyelet portion are at least partially inserted through the eyelet portion to form the collapsible loop prior to the first locking structure being pulled through the eyelet portion.

14. The inflatable balloon fastener apparatus of claim 13, wherein when the collapsible loop is moved between the unlocked position and a locked position, the eyelet portion is biased to a size which allows passage of the first locking structure through the eyelet portion.

15. The inflatable balloon fastener apparatus of claim 14, wherein when the collapsible loop is in the locked and unlocked positions, the eyelet portion is sized smaller than the first locking structure to prevent the first locking structure from being inadvertently moved through the eyelet portion.

16. The inflatable balloon fastener apparatus of claim 11, wherein the first locking structure has a size larger in width and height than the eyelet portion of the two lengths of flexible cord when the eyelet portion is in an unbiased position.

* * * * *